United States Patent [19]
Suzuki et al.

[11] Patent Number: 5,330,237
[45] Date of Patent: Jul. 19, 1994

[54] PIPE JOINT FOR HYDRAULIC PIPE

[75] Inventors: Hiroshi Suzuki; Katsuya Miyata, both of Kariya; Minoru Kimura, Tokyo, all of Japan

[73] Assignees: Kabushiki Kaisha Toyoda Jidoshokki Seisakusho, Kariya; Tokiwa Seiki Co., Ltd., Tokyo, both of Japan

[21] Appl. No.: 845,699

[22] Filed: Mar. 4, 1992

[51] Int. Cl.⁵ .............................................. F16L 17/06
[52] U.S. Cl. ..................................... 285/281; 285/278; 285/98
[58] Field of Search ....................... 285/190, 278-282, 285/98, 179

[56] References Cited

U.S. PATENT DOCUMENTS

| | | | |
|---|---|---|---|
| 1,951,460 | 3/1934 | Williams et al. | 285/278 |
| 2,533,421 | 12/1950 | Bodnar | 285/279 |
| 2,560,263 | 7/1951 | Wiegand et al. | 285/281 |
| 2,632,659 | 3/1953 | Lee, II | 285/281 |
| 2,907,590 | 10/1959 | Oswald | 285/281 |
| 2,926,935 | 3/1960 | LaMarre | 285/280 |
| 3,145,035 | 8/1964 | Hanback | 285/190 |
| 3,999,781 | 12/1976 | Todd | 285/281 |
| 4,042,262 | 8/1977 | Mooney et al. | 285/281 |
| 4,239,262 | 12/1980 | Krupp et al. | |
| 4,478,438 | 10/1984 | Elorriaga, Jr. | 285/281 |
| 4,763,693 | 8/1988 | Valley | 285/182 |

FOREIGN PATENT DOCUMENTS

| | | |
|---|---|---|
| 641125 | 8/1950 | United Kingdom . |
| 723647 | 2/1955 | United Kingdom ............. 285/278 |

*Primary Examiner*—Eric K. Nicholson
*Attorney, Agent, or Firm*—Brooks Haidt Haffner & Delahunty

[57] ABSTRACT

A pipe joint can be attached to a hydraulic apparatus so as to be able to absorb vibrations of a pipe or the like connected to thereto. The pipe joint comprises a joint member having one end provided with an externally threaded portion in which external threads are cut, an annular clearance groove and an O ring squeezing surface, and an intermediate member to be fixedly screwed in the hydraulic apparatus, provided with an internally threaded portion in which internal threads are cut and an annular clearance groove. When the externally threaded portion of the joint member is screwed completely in the intermediate member, the externally threaded portion of the joint member drops into the annular clearance groove of the intermediate member, and the internally threaded portion of the intermediate member drops into the annular clearance groove of the joint member, so that the joint member is able to turn relative to the intermediate member.

12 Claims, 6 Drawing Sheets

PIPE JOINT FOR HYDRAULIC PIPE

BACKGROUND OF THE INVENTION

1. Field of the Invention

The present invention relates to a pipe joint for use in the piping of a hydraulic circuit including hydraulic apparatus and, more specifically, to a pipe joint effective for properly attaching an elbow to a hydraulic apparatus.

2. Description of the Prior Art

Referring to FIG. 13 showing a conventional washer-faced 90 degree elbow, the body 41 of the elbow has one end provided with a threaded portion 42 for screw engagement with a pipe and the other end provided with a threaded portion 43 for screw engagement with a hydraulic apparatus 47. In attaching the elbow to the hydraulic apparatus 47, the threaded portion 43 is screwed in a connection port 48 by a predetermined depth, the direction of the elbow is determined, and then, a locknut 44 is screwed down firmly against a backup washer 45 to fix the elbow in place. When the locknut 44 is screwed down, an O ring 46 is squeezed flat so as to be in close contact with the outer circumference of the body 41, the backup washer 45 and the inner surface of the connecting port 48 of the hydraulic apparatus 47 for sealing.

As mentioned above, since a conventional pipe joint is attached fixedly to the hydraulic apparatus 47, it is possible that leakage occurs due to the loosening of the pipe joint relative to the hydraulic apparatus 47 or the loosening of connection between the pipe joint and a pipe caused by the vibration of the pipe or the like if the direction of the pipe joint is not determined properly taking into consideration the handling of the pipe, and the movement and vibration of the pipe.

In screwing the elbow of FIG. 13 in the hydraulic apparatus 47, a cylindrical space of a radius l (FIG. 13) must be secured around the elbow. Therefore, in connecting a plurality of pipes to a hydraulic apparatus, such as an oil control valve provided on a forklift truck, in a limited space, some measures, such as attaching pipe joints in different heights, must be taken to avoid interference between the adjacent pipe joints. Therefore, in attaching conventional washer-faced elbows to a hydraulic apparatus, a sufficiently large space must be secured on the hydraulic apparatus and an appropriate method of attaching the pipe joint must be contrived. Thus, the conventional pipe joint is disadvantageous in collectively arranging a plurality of pipe joints, in arranging a plurality of pipe joints in a narrow space and removing some of a plurality of pipe joints from the hydraulic apparatus for replacement. Furthermore, since the O ring 46 is squeezed and the backup washer 45 must slide smoothly relative to the body 41 of the elbow in screwing down the locknut 44, the inside diameter of the backup washer 45 and the outside diameter of the O ring groove formed in the circumference of the body 41 must be finished in a considerably high accuracy, which is disadvantageous in manufacturing the elbow.

SUMMARY OF THE INVENTION

In view of the first problem, it is a first object of the present invention to provide a pipe joint capable of absorbing the vibration of a pipe or the like connected thereto when the pipe joint is attached to a hydraulic apparatus.

In view of the second problem, it is a second object of the present invention to provide a pipe joint capable of attaching an elbow without turning the body of the same.

To solve the problems, the present invention provides a pipe joint for hydraulic pipe, comprising: an elbow body having one end provided with a connecting part to be connected to a pipe, and the other end provided with a threaded portion in which left-hand threads are cut and a clearance groove; and a tubular adapter having one end having a threaded portion provided with left-hand internal threads and a clearance groove, and the other end having a threaded portion provided with right-hand external threads to be engaged with an apparatus, and an O ring groove. The threaded portion of the elbow body is screwed in the threaded portion provided with the left-hand internal threads of the adapter so that an O ring is pressed between the elbow body and the adapter and the O ring is able to turn in the clearance groove.

The present invention provides also a pipe joint for hydraulic pipe, comprising: an elbow body having one end provided with a connecting portion to be connected to a pipe and the other end provided with either an annular groove or a threaded portion provided with external threads; a tubular adapter having one end provided with an annular groove if the other end of the elbow body is provided with a threaded portion provided with external threads or a threaded portion provided with internal threads if the other end of the elbow body is provided with an annular groove, and the other end provided with an O ring groove and a threaded portion provided with external threads to be engaged with an apparatus; and a nut having one end provided internally with a flange capable of loosely fitting in the annular groove, and the other end having a threaded portion provided with internal threads mating with the external threads. The internal threads of the nut and the external threads are engaged with the flange fitted in the annular groove to join together the elbow body and the adapter with an O ring pressed between the elbow body and the adapter.

The present invention further provides a connecting structure for connecting a pipe joint for hydraulic pipe and a hydraulic apparatus, comprising: forming an annular clearance groove, an externally threaded portion and an O ring squeezing surface in that order toward the extremity of one end of a pipe joint having the other end provided with a connecting portion to be connected to a pipe; forming an internally threaded portion, an annular clearance groove and an ring squeezing surface in that order from the outer end toward the inner end of a connecting port of a hydraulic apparatus; and screwing the externally threaded portion of the pipe joint in the internally threaded portion of the connecting port of the hydraulic apparatus to press an O ring between the O ring squeezing surfaces so that externally threaded portion of the pipe joint is received loosely in the clearance groove of the hydraulic apparatus and the internally threaded portion of the hydraulic apparatus is received loosely in the clearance groove of the pipe joint.

When the threaded portion provided with the left-hand external threads of the elbow body is screwed completely into the threaded portion provided with the left-hand internal threads of the adapter, the O ring is squeezed properly by a predetermined squeeze between the elbow body and the adapter and the threaded portions are received respectively in the corresponding clearance grooves to enable the elbow body to turn relative to the adapter. Thus, the junction of the elbow body and the adapter is sealed with the O ring while the elbow body is able to turn relative to the adapter. The adapter is screwed in the hydraulic apparatus without turning the elbow body and the elbow body can be set in a desired direction.

The O ring fitted in the O ring groove of the adapter is squeezed between the adapter and the hydraulic apparatus for sealing.

After the adapter has been attached to the hydraulic apparatus, the elbow body is fastened to the adapter with the nut engaging the elbow body or the adapter to squeeze the O ring between the elbow body and the adapter for sealing.

When the threaded portion of the pipe joint of the present invention for hydraulic pipe is screwed in the internally threaded portion of the hydraulic apparatus, the O ring is squeezed properly between the O ring squeezing surfaces of the pipe joint and the hydraulic apparatus for satisfactory sealing, and the externally threaded portion and the internally threaded portion are received respectively in the corresponding clearance grooves to enable the pipe joint to turn relative to the hydraulic apparatus.

Accordingly, the pipe joint can be turned in a desired direction relative to the hydraulic apparatus and can be set in a desired direction.

DETAILED DESCRIPTION OF THE PREFERRED EMBODIMENTS

Preferred embodiments of the present invention will be described hereinafter with reference to the accompanying drawings.

Figure 1:
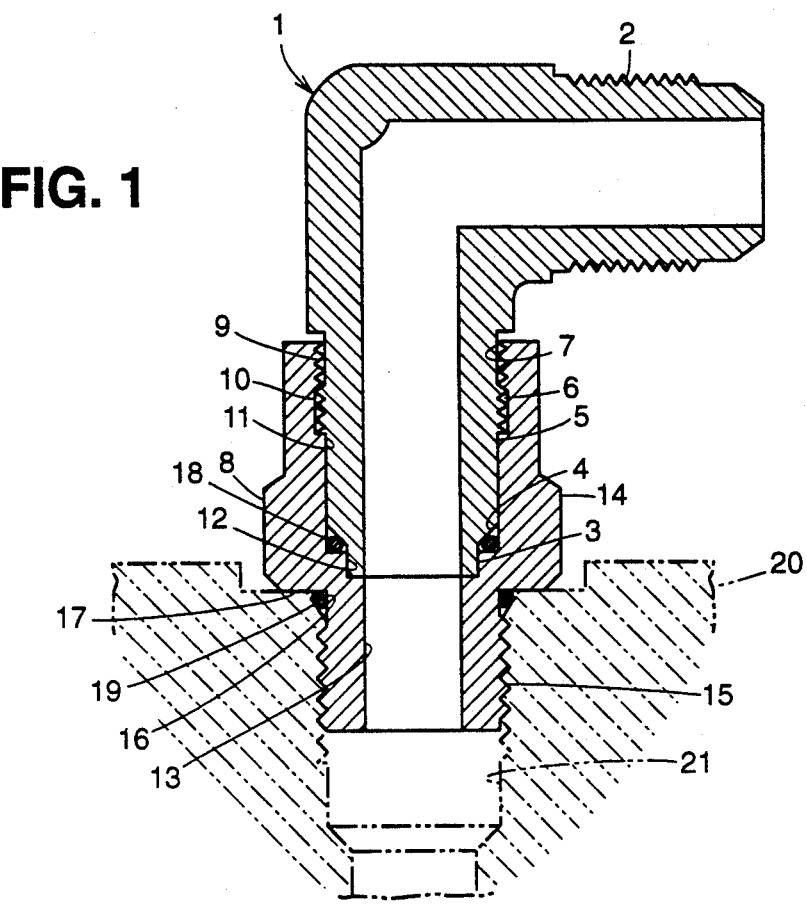
FIG. 1 is a longitudinal sectional view of a pipe joint in a first embodiment according to the present invention for hydraulic pipe.

First, a pipe joint in a first embodiment according to the present invention will be described with reference to FIGS. 1 and 2. As shown in FIG. 1, the pipe joint comprises a 90 degree elbow body 1 and an adapter 8.

Figure 2:
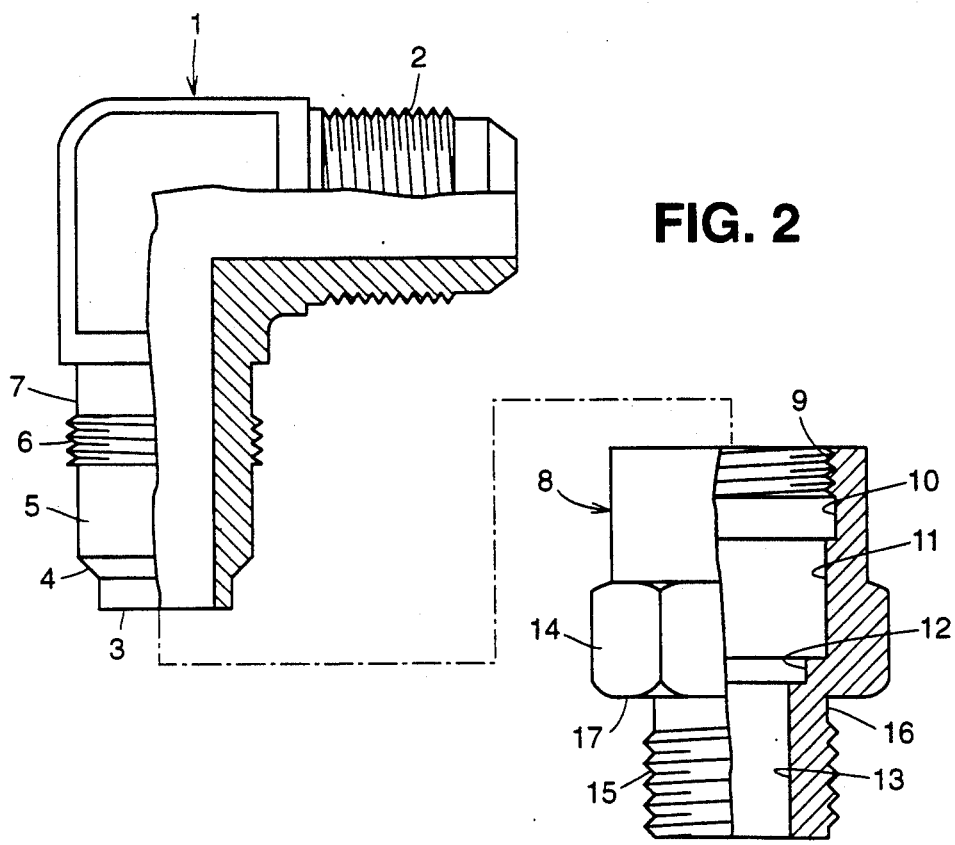
FIG. 2 is an exploded, partially sectional view of the pipe joint of FIG. 1.

As shown in FIG. 2, the elbow body 1 has a pipe-connecting end having a portion 2 provided with external threads, and a joining end provided in its outer circumference with a reduced portion 3, a tapered O ring squeezing surface 4, a round portion 5, an externally threaded portion 6 provided with left-hand external threads having a minor diameter slightly greater than the diameter of the round portion 5, an annular clearance groove 7 having a circular bottom surface having a diameter smaller than the minor diameter of the left-hand external threads of the externally threaded portion 6 formed in that order from the tip of the joining end upward.

The adapter 8 having a substantially cylindrical shape is provided in its inner circumference, from the upper end to the lower end, with an internally threaded portion 9 provided with left-hand internal threads mating with the left-hand external threads of the externally threaded portion 6 of the elbow body 1, an annular clearance groove 10 having a diameter greater than the major diameter of the left-hand internal threads of the internally threaded portion 9, a larger round hole 11 for closely receiving the round portion 5 of the elbow body 1, a smaller round hole 12 for closely receiving the reduced portion 3 of the elbow body 1, and a smallest round hole 13 having a diameter smaller than that of the smaller round hole 12. The adapter 8 is provided in the middle portion of its outer circumference with a hexagonal portion 14 to be gripped between the jaws of a spanner, an externally threaded portion 15 provided with right-hand external threads in the lower end, and an O ring groove 16 formed between the hexagonal portion 14 and the externally threaded portion 15. The lower surface of the hexagonal portion 14 serves as an O ring squeezing surface 17.

The elbow body 1 and the adapter 8 are combined in the following manner. As shown in FIG. 1, an O ring 18 is put on the elbow body 1 in contact with the tapered O ring squeezing surface 4, and the externally threaded portion 6 of the elbow body 1 is screwed in the internally threaded portion 9 of the adapter 8 by turning the elbow body 1 counterclockwise. Then, the reduced portion 3 is fitted in the smaller round hole 12, the larger round portion 5 is fitted in the larger round hole 11, and the O ring 18 is pressed against the shoulder between the larger round hole 11 and the smaller round hole 12. When the externally threaded portion 6 of the elbow body 1 is screwed completely in the internally threaded portion 9 of the adapter 8, the O ring 18 is squeezed properly between the tapered O ring squeezing surface 4 and the shoulder.

On the other hand, the externally threaded portion 6 drops into the clearance groove 10 of the adapter 8, and the internally threaded portion 9 of the adapter 8 drops into the clearance groove 7 of the elbow body 1. Thus, the junction of the elbow body 1 and the adapter 8 is sealed with the O ring 18 and the elbow body 1 is able to turn relative to the adapter 8.

In attaching the combination of the elbow body 1 and the adapter 8 to a hydraulic apparatus 20, the elbow body 1 is set in a desired direction, and then, the adapter 8 is turned clockwise to screw the externally threaded portion 15 provided with the right-hand threads into an internally threaded connecting port 21 of the hydraulic apparatus 20. Since the elbow body 1 is able to turn relative to the adapter 8, the elbow body 1 remains in the set direction while the adapter 8 is being screwed in the connecting port 21 of the hydraulic apparatus 20. Although the upper end of the externally threaded portion 6 of the elbow body 1 is pressed against the lower end of the internally threaded portion 9 of the adapter 8 by the resilience of the O ring 18 in turning the adapter 8 clockwise to screw the externally threaded portion 15 of the adapter in the connecting port 21 of the hydraulic apparatus 20, the threads of the externally threaded portion 6 and the internally threaded portion 9 are not engaged, because the threads of the externally threaded portion 6 and those of the internally threaded portion 9 are left-hand threads.

When the adapter 8 is fastened to the hydraulic apparatus 20, an O ring put in the O ring groove 16 of the adapter 8 is squeezed between the O ring squeezing surface 17 of the hexagonal portion 14 and the hydraulic apparatus 20 to seal the junction of the adapter 8 and the hydraulic apparatus 20 and the O ring squeezing surface 17 is in close contact with the surface of the hydraulic apparatus 20.

Thus, the elbow body 1 can be set in a desired direction without requiring the adjustment of the depth of insertion of the pipe joint in the hydraulic apparatus 20, the pipe joint omits the backup washer and the locknut, and the pipe joint can be fastened to the hydraulic apparatus 20 without paying attention to the bulging of the O ring, which occurs in fastening a pipe joint requiring a backup washer. Since the elbow body 1 is able to move more or less relative to the adapter 8 fastened to the hydraulic apparatus 20, vibrations of the pipe connected to the elbow body 1 can be absorbed by the movement of the elbow body 1 relative to the adapter 8, which is effective on preventing the loosening of the adapter 8.

Figure 3:
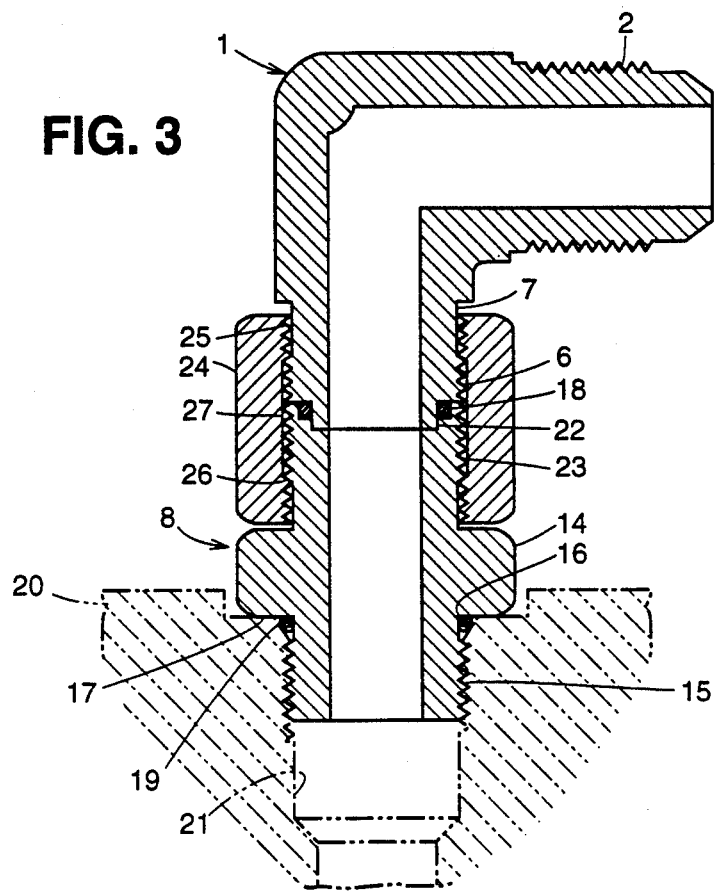
FIG. 3 is a longitudinal sectional view of a pipe joint in a second embodiment according to the present invention for hydraulic pipe.
Figure 4:
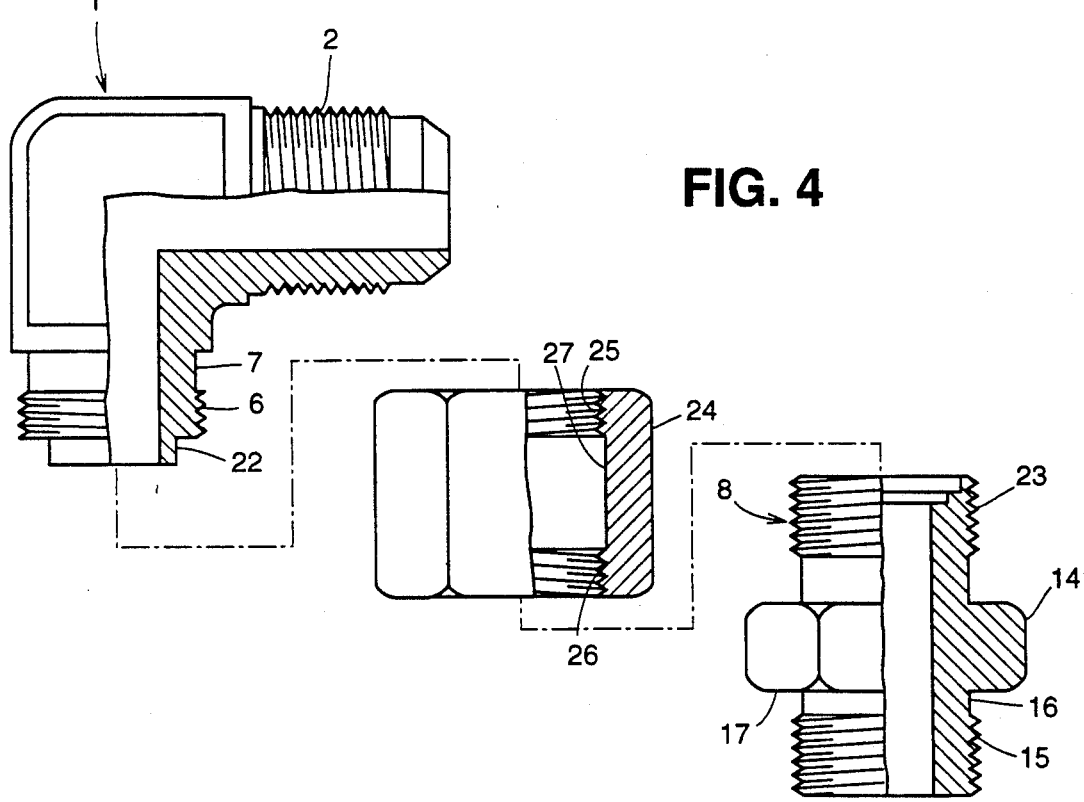
FIG. 4 is an exploded, partially sectional view of the pipe joint of FIG. 3.

A pipe joint in a second embodiment according to the present invention will be described hereinafter with reference to FIGS. 3 and 4. The pipe joint in the second embodiment comprises an elbow body 1, an adapter 8 and a coupling nut 24. The elbow body 1 and the adapter 8 are coupled together by the coupling nut 24, and the junction of the elbow body 1 and the adapter 8 is sealed with an O ring.

A reduced portion 22 formed at the lower end of the elbow body 1 is nested in a round hole formed in the upper end of the adapter 8, and an O ring 18 is interposed between the outer circumference of the reduced portion 22 and the inner circumference of the round hole of the adapter 8. The adapter 8 has an upper end having an externally threaded portion 23 in which right-hand external threads are cut. In FIGS. 3 and 4, portions of the elbow body 1 and the adapter 8 like or corresponding to those of the elbow body 1 and the adapter 8 of the pipe joint in the first embodiment are denoted by the same reference characters and the description thereof will be omitted.

The coupling nut 24 has one end having an internally threaded portion 25 in which left-hand internal threads mating with the left-hand external threads of the externally threaded portion 6 of the elbow body 1 are cut and the other end having an internally threaded portion 26 in which right-hand internal threads mating with the right-hand external threads of the threaded portion 23 of the adapter 8 are cut. A clearance groove 27 having a diameter greater than the major diameter of the left-hand internal threads of the internally threaded portion 25 and the right-hand internal threads of the internally threaded portion 26 is formed between the internally threaded portions 25 and 26.

The coupling nut 24 is turned counterclockwise to receive the externally threaded portion 6 of the elbow body 1 in the internally threaded portion 25 and, finally, the externally threaded portion 6 of the elbow body 1 drops into the clearance groove 27 of the coupling nut 24. Thus, the elbow body 1 and the coupling nut 24 are combined so that the coupling nut 24 is able to turn relative to the elbow body 1. Then, the coupling nut 24 is turned clockwise to receive the externally threaded portion 23 of the adapter 8 in the internally threaded portion 26 of the coupling nut 24 to combine the adapter 8 and the coupling nut 24. Thus, the elbow body 1 and the adapter 8 are coupled by the coupling nut 24.

In attaching the assembly of the elbow body 1, the adapter 8 and the coupling nut 24 to a hydraulic apparatus 20, first the coupling nut 24 is fastened temporarily to the adapter 8, and the adapter 8 and the coupling nut 24 are turned clockwise to screw the externally threaded portion 15 of the adapter 8 in an internally threaded connecting port 21 formed in the hydraulic apparatus 20 with the elbow body 1 set in a desired direction to fasten the adapter 8 to the hydraulic apparatus 20. Then, the coupling nut 24 is turned to fasten the same to the adapter 8; consequently, the elbow body 1 is brought into abutment against the adapter 8 and thereby the O ring 18 is squeezed properly between the elbow body 1 and the adapter 8 for sealing.

Thus, the pipe joint in the second embodiment, similarly to the pipe joint in the first embodiment, is capable of being attached to the hydraulic apparatus 20 without turning the elbow body 1.

Figure 5:
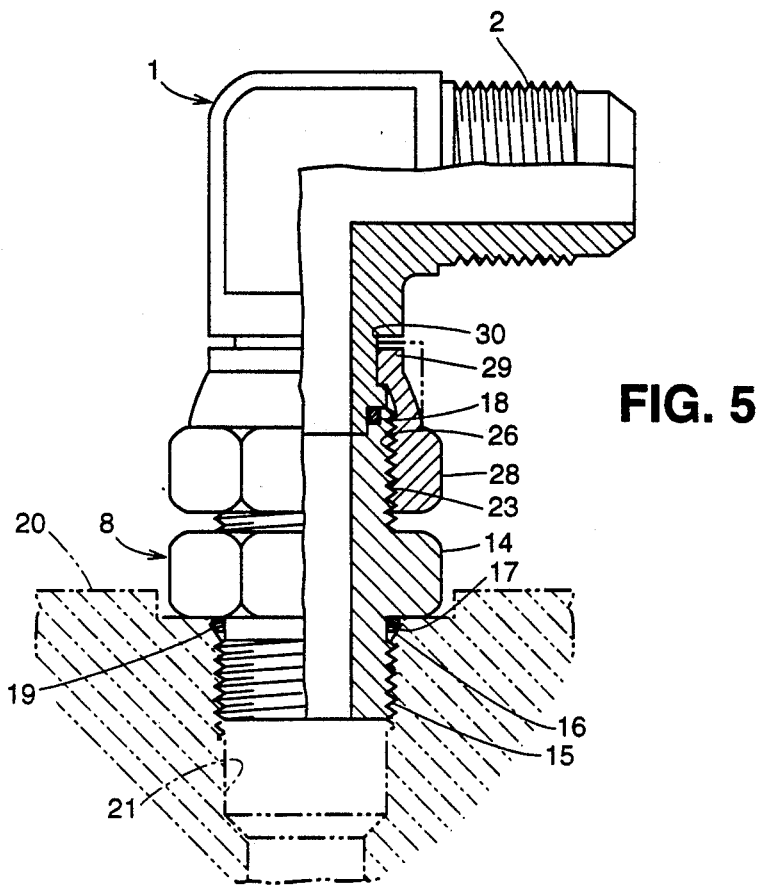
FIG. 5 is a partially sectional view of a pipe joint in a third embodiment according to the present invention for hydraulic pipe.

A pipe joint in a third embodiment according to the present invention will be described hereinafter with reference to FIG. 5. The pipe joint in the third embodiment is substantially the same as the pipe joint in the second embodiment in construction except that the pipe joint in the third embodiment employs a crimping nut 28 instead of the coupling nut 24 employed in the second embodiment. Accordingly, parts and portions like or corresponding to those of the first embodiment are denoted by the same reference characters and the description thereof will be omitted.

The crimping nut 28 has a nut portion 26 provided with a right-hand internal thread, and an annular, internal projection 29. The projection 29 is fitted by pressing in an annular groove 30 formed in the outer circumference of the elbow body 1 so that the elbow body 1 is able to turn relative to the crimping nut 28. The projection 29 is in a shape indicated by imaginary lines in FIG. 5 before the same is combined with the elbow body 1 by pressing. The right-hand internal threads of the internally threaded portion 26 of the crimping nut 28 engage the right-hand external threads of the externally threaded portion 23 of the adapter 8.

The pipe joint in the third embodiment can be assembled and attached to a hydraulic apparatus 20 in the same manner as that in which the pipe joint in the second embodiment is assembled and attached to the hydraulic apparatus 20, except that the manner of combining the crimping nut 28 and the elbow body 1 is different from that of combining the coupling nut 24 and the elbow body 1.

Figure 6:
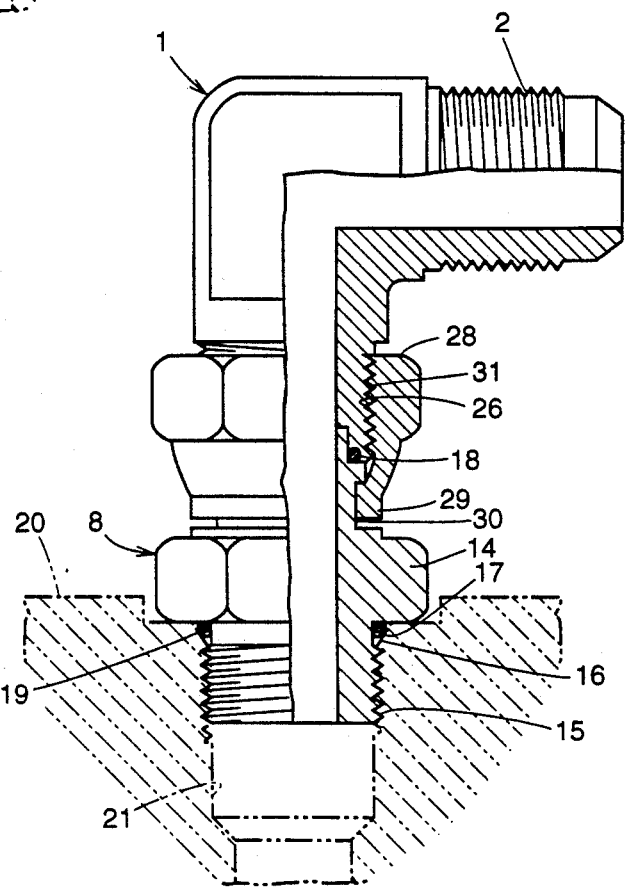
FIG. 6 is a partially sectional view of a pipe joint in a fourth embodiment according to the present invention for hydraulic pipe.

A pipe joint in a fourth embodiment according to the present invention will be described hereinafter with reference to FIG. 6. The pipe joint in the fourth embodiment employs an elbow body 1, an adapter 8 and a crimping nut 28 similar to those of the pipe joint in the third embodiment. In the fourth embodiment, the crimping nut 28 is combined with the adapter 8 instead of the elbow body 1.

The construction of the pipe joint in the fourth embodiment is the same as that of the pipe joint in the third embodiment, except that, in the fourth embodiment, a projection 29 formed at the extremity of one end of the crimping nut 28 is fitted in an annular groove 30 formed in the outer circumference of the upper end of the adapter 8, and an internally threaded portion 26, in which a right-hand internal threads are cut, formed in the other end of the crimping nut 28 engages an externally threaded portion 31, in which right-hand external threads are cut, formed in the lower end of the elbow body 1.

The pipe joint in the fourth embodiment can be attached to a hydraulic apparatus 20 by a manner like that in which the pipe joint in the second or third embodiment is attached to the hydraulic apparatus 20; the crimping nut 28 is fastened to the elbow body 1 after screwing the adapter 8 in and fastening the same to the hydraulic apparatus 20.

A pipe joint structure in a fifth embodiment according to the present invention for connecting a pipe joint and a hydraulic apparatus will be described with reference to FIGS. 7 and 8. As shown in FIG. 8, an elbow body 1 has one end provided with an externally threaded portion 2 to be screwed in a pipe and the other end, which is to be joined to a hydraulic apparatus 20, provided with a reduced portion 49, a tapered O ring squeezing surface 50, a round portion 51, an externally threaded portion 52 in which an external threads having a minor diameter slightly greater than the diameter of the round portion 51 are cut and an annular clearance groove 53 having a diameter smaller than minor diameter of the external threads formed in the externally threaded portion 52, which are formed in that order from the extremity of the other end.

As shown in FIG. 8, the hydraulic apparatus 20 is provided with a substantially round connecting port 54 for receiving the elbow body 1. The connecting port 54 is provided on its inner circumference with an internally threaded portion 55 in which internal threads mating with the external threads formed in the externally threaded portion 52 of the elbow body 1 are cut, a clearance groove 56 having a diameter greater than the major diameter of the internal threads of the internally threaded portion 55, and a stepped hole 57 for receiving the reduced portion 49 and the round portion 51 of the elbow body 1, having a shoulder 58 serving as an O ring squeezing surface, which are formed in that order from the outer end toward the inner end of the connecting port 54.

The elbow body 1 is attached to the hydraulic apparatus 20 in the following manner.

Figure 7:
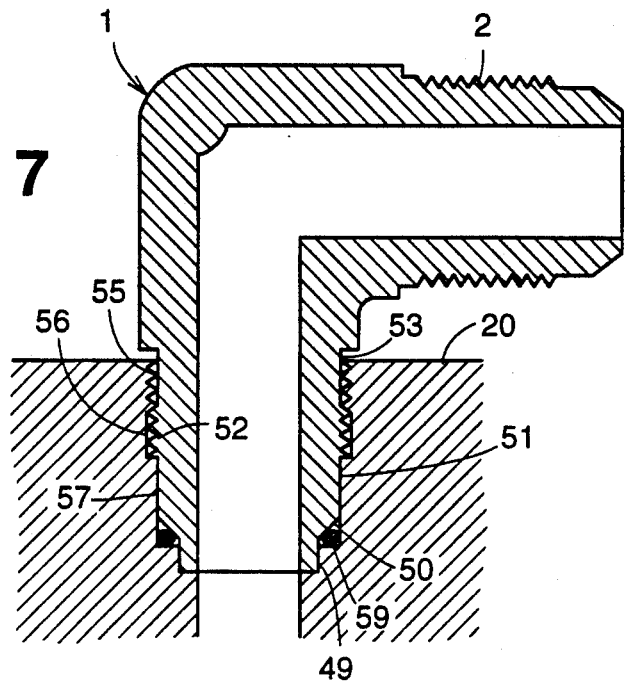
FIG. 7 is a longitudinal sectional view of a pipe joint structure in a fifth embodiment according to the present invention for interconnecting hydraulic apparatus.
Figure 8:
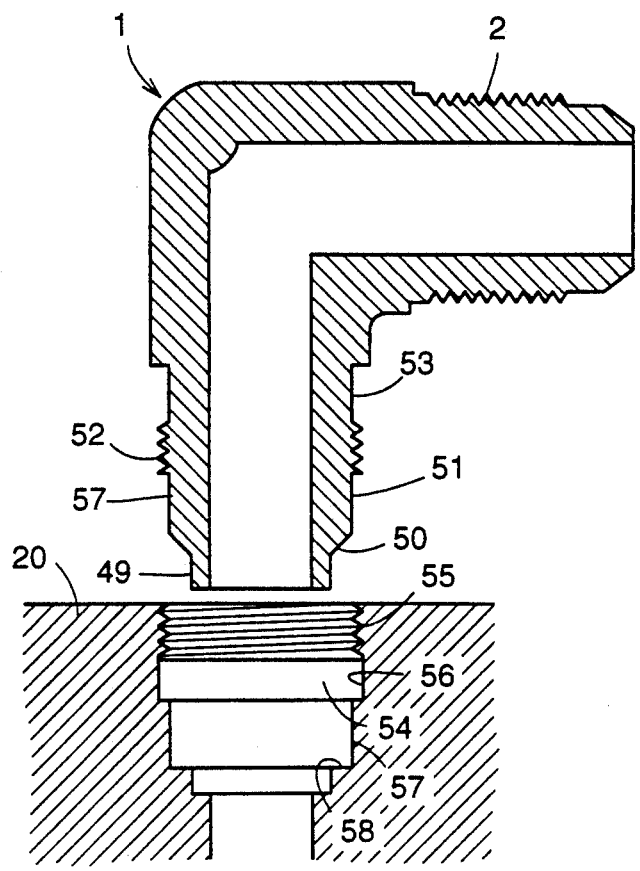
FIG. 8 is an exploded longitudinal sectional view of the pipe joint structure of FIG. 7.

As shown in FIG. 7, an O ring 59 is put on the tapered O ring squeezing surface 50 of the elbow body 1, and then, the externally threaded portion 52 of the elbow body 1 is screwed in the internally threaded portion 55 of the hydraulic apparatus 20. In this state, the reduced portion 49 and the round portion 51 are fitted in the stepped hole 57 and the O ring 59 is squeezed between the tapered O ring squeezing surface 50 and the shoulder 58.

When the externally threaded portion 52 of the elbow body 1 is screwed completely in the internally threaded portion 55 of the connecting port 54, the O ring 59 is squeezed properly between the tapered O ring squeezing surface 50 and the shoulder 58, the externally threaded portion 52 drops into the clearance groove 56 of the connecting port 54, and the internally threaded portion 55 drops into the clearance groove 53 of the elbow body 1, so that the elbow body 1 is able to turn relative to the hydraulic apparatus 20. Thus, the junction of the elbow body 1 and the hydraulic apparatus 20 is sealed with the O ring 59 while the elbow body 1 is able to turn relative to the hydraulic apparatus 20 against a counteracting force produced by the resilience of the squeezed O ring 59.

Since the elbow body 1 can be set in a desired direction on the hydraulic apparatus 20, a pipe or a tube can easily be connected to the elbow body 1 without bending or twisting the same and vibrations of the pipe or tube connected to the elbow body 1 can be absorbed by the movement of the elbow body 1. Since neither a backup washer nor a locknut is necessary, the bulging of the O ring, which occurs in attaching a pipe joint provided with a backup washer to a hydraulic apparatus, need not be taken into consideration, which facilitates the fabrication of the pipe joint structure.

Figure 9:
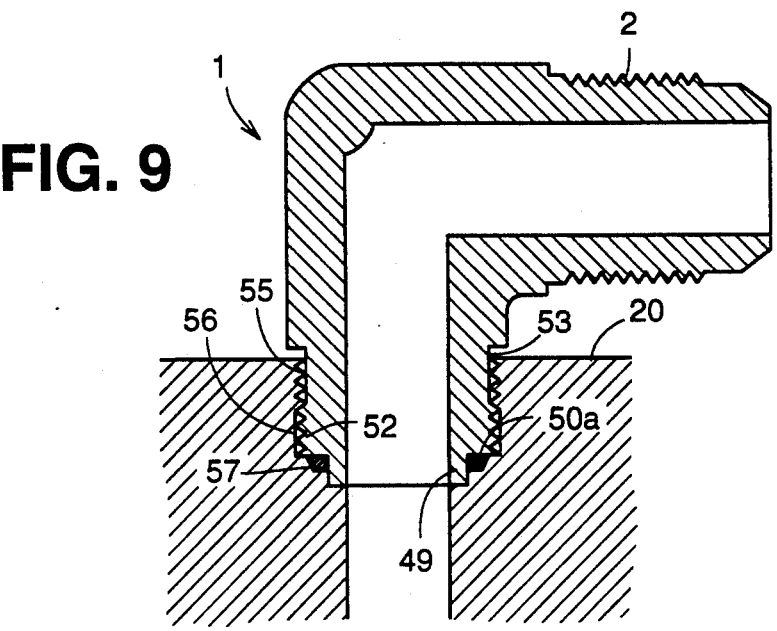
FIG. 9 is a longitudinal sectional view of a pipe joint structure in a sixth embodiment according to the present invention for interconnecting a pipe joint and a hydraulic apparatus.
Figure 10:
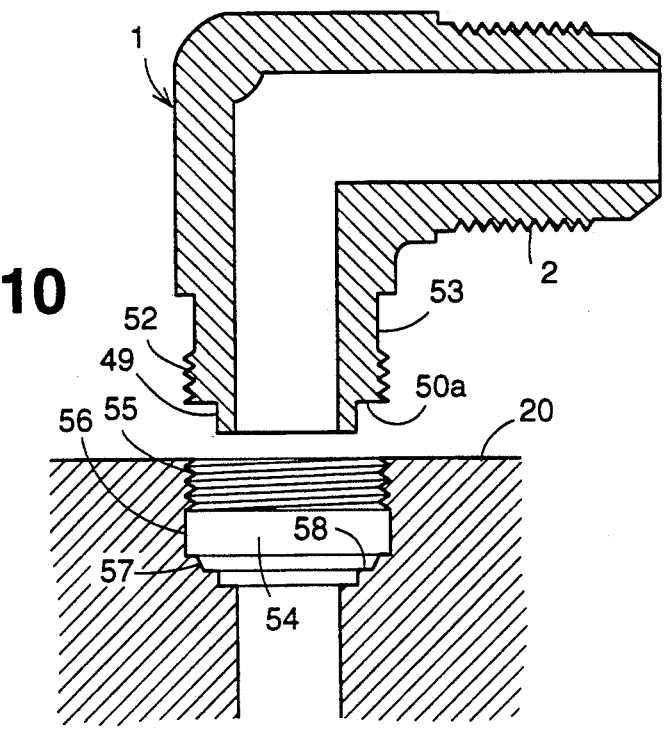
FIG. 10 is an exploded, longitudinal sectional view of the pipe joint structure of FIG. 9.

A pipe joint structure in a sixth embodiment according to the present invention will be described hereinafter with reference to FIGS. 9 and 10. The pipe joint structure in the sixth embodiment is the same as the pipe joint structure in the fifth embodiment in construction, except that an elbow body 1 in the sixth embodiment is provided with a flat O ring squeezing surface 50a, and hence parts and portions like or corresponding to those of the pipe joint structure in the fourth embodiment are denoted by the same reference characters and the description thereof will be omitted.

Figure 11:
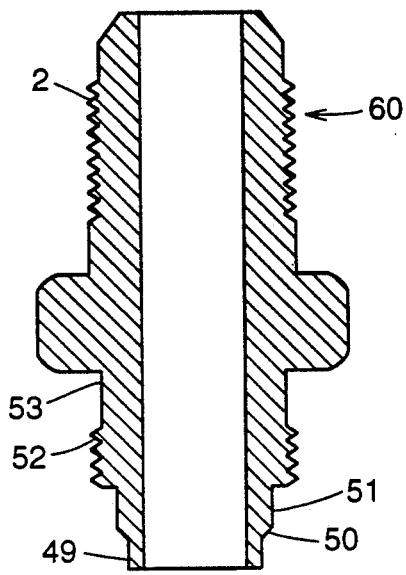
FIG. 11 is a longitudinal sectional view of a nipple embodying the present invention.
Figure 12:
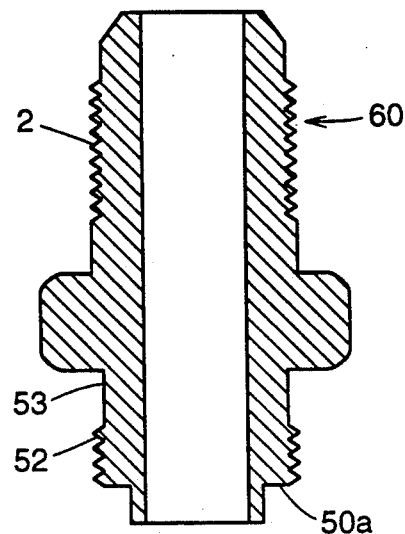
FIG. 12 is a longitudinal sectional view of another nipple embodying the present invention.
Figure 13:
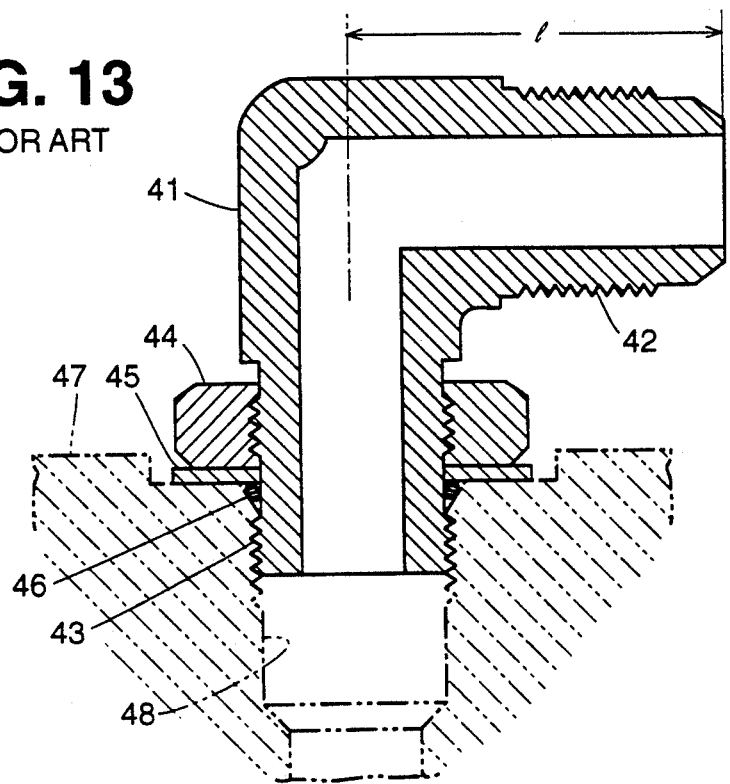
FIG. 13 is a longitudinal sectional view of a conventional washer-faced elbow.

FIGS. 11 and 12 show pipe joint structures in which the present invention is applied to a nipple 60. These pipe joint structures are substantially the same as the pipe joint structure in the sixth embodiment, except that the pipe joint structures shown in FIGS. 11 and 12 use the nipple 60 instead of the elbow body 1. Accordingly, parts and portions like or corresponding to those of the pipe joint structure in the sixth embodiment are denoted by the same reference characters and the description thereof will be omitted. The pipe joint structure shown in FIG. 11 squeezes an O ring in an annular groove having a triangular cross section, while the pipe joint structure shown in FIG. 11 squeezes an O ring in an annular groove having a rectangular cross section.

Although the invention has been illustrated and described in its preferred embodiments, the present invention is not necessarily limited thereto in its practical application and may be practiced otherwise than as specifically described herein without departing from the spirit and scope thereof. For example, in the pipe joint shown in FIGS. 1 and 2, the external threads formed on the elbow body and the mating internal threads formed on the adapter are interchangeable.

As is apparent from the foregoing description, the direction of the pipe joint in accordance with the present invention need not be determined by adjusting the length of engagement of the pipe joint and the hydraulic apparatus, and hence the pipe joint need not be provided with a backup washer and a locknut, which are indispensable to the conventional washer-faced elbow. Accordingly, the bulging of the O ring and sliding movement of the backup washer on the elbow body need not be taken into consideration in fabricating the pipe joint.

Furthermore, since the pipe joint in accordance with the present invention can be attached to a hydraulic apparatus with the connecting portion of the elbow body held in a set direction, a plurality of such pipe joints can be arranged on a hydraulic apparatus without attaching the pipe joint in different heights to avoid interference between the pipe joints and hence the pipe joints can be attached to the hydraulic apparatus in a high density, which is effective in collectively arranging a plurality of pipe joints in a narrow space.

Still further, the pipe joint of the present invention facilitates work for attaching the pipe joint to a hydraulic apparatus and work for removing one of the pipe joints attached collectively to a hydraulic apparatus.

What is claimed is:

1. A pipe joint for hydraulic pipe, comprising:
an elbow body having a first end provided with a connecting portion to be connected to a pipe, and a second end provided with a threaded portion and an annular clearance groove, which are arranged axially and successively; and
a cylindrical adapter having a first end provided with a threaded portion and an annular clearance groove, and a second end provided with an externally threaded portion, in which external threads are cut, to be screwed in a hydraulic apparatus;
wherein the respective threaded portions of the elbow body and the adapter drop into the respective annular clearance grooves of the adapter and the elbow body, respectively, when the elbow body is screwed completely in the adapter so that the elbow body is able to turn relative to the adapter.

2. A pipe joint according to claim 1, wherein the threads cut in the respective threaded portions of the elbow body and the adapter are left-hand threads.

3. A pipe joint according to claim 1, wherein the threaded portion and the annular clearance groove of the elbow body are formed successively in that order from the extremity of the second end of the elbow body.

4. A pipe joint according to claim 1, wherein the annular clearance groove and the threaded portion of the first end of the adapter are formed successively in that order toward the extremity of the first end.

5. A pipe joint according to claim 1, wherein an O ring is interposed between the elbow body and the adapter so as to be squeezed when the elbow body and the adapter are coupled completely.

6. A pipe joint according to claim 1, wherein the adapter is provided in its outer circumference with an O ring groove for receiving an O ring for sealing the junction of the adapter and the hydraulic apparatus therein.

7. A pipe joint for hydraulic pipe, comprising:
an elbow body having a first end provided with a connecting portion to be connected to a pipe, and a second end provided with an external annular groove;
a cylindrical adapter having a first end provided with a first externally threaded portion, and a second end provided with a second externally threaded portion to be screwed in an hydraulic apparatus;
a substantially cylindrical nut having a first end provided with an internal projection capable of being movably fitted in said annular groove, and a second end provided with an internally threaded portion having threads capable of mating with said first externally threaded portion;
the internally threaded portion of said nut and said first externally threaded portion of said adapter being engageable after fitting the internal projection of said nut in said annular groove to bring said elbow body into abutment against the adapter so as to be able to turn relative to the adapter; and
an O-ring for installation between said elbow body and the adapter, said elbow body having a tapered O-ring squeezing surface, and the O-ring is squeezed between the elbow body and the adapter in an annular groove having a triangular cross section formed between said tapered O-ring squeezing surface of the elbow body and an O-ring squeezing surface of the adapter when the elbow body and the adapter are coupled completely.

8. A pipe joint for hydraulic pipe, comprising:
an elbow body having a first end provided with a connecting portion to be connected to a pipe, and a second end provided with an externally threaded portion;
a cylindrical adapter having a first end provided with an external annular groove, and a second end provided with an externally threaded portion to be screwed in an hydraulic apparatus; and
a substantially cylindrical nut having a first end provided with an internal projection capable of being movably fitted in said annular groove, and a second end provided with an internally threaded portion having threads capable of mating with said externally threaded portion of said elbow body;
wherein the internally threaded portion of said substantially cylindrical nut and the externally threaded portion of said elbow body are engaged after fitting the internal projection of said nut in the annular groove to bring the elbow body into abutment against the adapter so as to be able to turn relative to the adapter; and
an O-ring for installation between said elbow body and the adapter, said elbow body having a tapered O-ring squeezing surface, and the O-ring is squeezed between the elbow body and the adapter in an annular groove having a triangular cross section formed between said tapered O-ring squeezing surface of the elbow body and an O-ring squeezing surface of the adapter when the elbow body and the adapter are coupled completely.

9. A pipe joint for hydraulic pipe, comprising:
an elbow body having a first end provided with a connecting portion to be connected to a pipe, and a second end provided with an external annular groove;
a cylindrical adapter having a first end provided with a first externally threaded portion, and a second end provided with a second externally threaded portion to be screwed in an hydraulic apparatus;
a substantially cylindrical nut having a first end provided with an internal projection capable of being movably fitted in said annular groove, and a second end provided with an internally threaded portion having threads capable of mating with said first externally threaded portion;

the internally threaded portion of said nut and said first externally threaded portion of said adapter being engageable after fitting the internal projection of said nut in said annular groove to bring said elbow body into abutment against the adapter so as to be able to turn relative to the adapter; and said adapter is provided in its outer circumference with an O-ring groove for receiving an O-ring for sealing the junction of the adapter and the hydraulic apparatus.

10. A pipe joint for hydraulic pipe, comprising:

an elbow body having a first end provided with a connecting portion to be connected to a pipe, and a second end provided with an externally threaded portion;

a cylindrical adapter having a first end provided with an external annular groove, and a second end provided with an externally threaded portion to be screwed in an hydraulic apparatus; and a substantially cylindrical nut having a first end provided with an internal projection capable of being movably fitted in said annular groove, and a second end provided with an internally threaded portion having threads capable of mating with said externally threaded portion of said elbow body;

wherein the internally threaded portion of said substantially cylindrical nut and the externally threaded portion of said elbow body are engaged after fitting the internal projection of said nut in the annular groove to bring the elbow body into abutment against the adapter so as to be able to turn relative to the adapter; and said adapter is provided in its outer circumference with an O-ring groove for receiving an O-ring for sealing the junction of the adapter and the hydraulic apparatus.

11. A pipe joint structure for hydraulic pipe, comprising:

an elbow body having a first end provided with a connecting portion to be connected to a pipe, and a second end provided with an externally threaded portion and an annular clearance groove;

a part of an hydraulic apparatus provided with a connecting port provided successively in its inner circumference with an internally threaded portion and an annular clearance groove;

the externally threaded portion of said elbow body and the internally threaded portion of said part of the hydraulic apparatus being constructed to drop respectively into the annular clearance grooves of the connecting port and the elbow body when the externally threaded portion of the elbow body is screwed completely into the connecting port of said hydraulic apparatus so that the elbow body is able to turn relative to the part of the hydraulic apparatus; and an O-ring for installation between said elbow body and the part of the hydraulic apparatus, said elbow body having a tapered O-ring squeezing surface, and said O-ring is squeezed between the elbow body and the part of the hydraulic apparatus in an annular groove having a triangular cross section formed between said tapered O-ring squeezing surface of said elbow body and a flat O-ring squeezing surface formed in the part of the hydraulic apparatus when the externally threaded portion of the elbow body is screwed completely into the part of the hydraulic apparatus.

12. A pipe joint structure for hydraulic pipe, comprising:

an elbow body having a first end provided with a connecting portion to be connected to a pipe, and a second end provided with an externally threaded portion and an annular clearance groove;

a part of an hydraulic apparatus provided with a connecting port provided successively in its inner circumference with an internally threaded portion and an annular clearance groove;

the externally threaded portion of said elbow body and the internally threaded portion of said part of the hydraulic apparatus being constructed to drop respectively into the annular clearance grooves of the connecting port and the elbow body when the externally threaded portion of the elbow body is screwed completely into the connecting port of said hydraulic apparatus so that the elbow body is able to turn relative to the part of the hydraulic apparatus; and an O-ring for installation between said elbow body and the part of the hydraulic apparatus, said elbow body having a flat O-ring squeezing surface, and said O-ring is squeezed between the elbow body and the part of the hydraulic apparatus in an annular groove having a rectangular cross section formed between said flat O-ring squeezing surface of said elbow body and a flat O-ring squeezing surface formed in the part of the hydraulic apparatus when the externally threaded portion of the elbow body is screwed completely into the part of the hydraulic apparatus.

* * * * *